April 1, 1969 P. A. DENES 3,435,518

METHOD OF MAKING A MINIATURE MAGNETIC CORE MEMORY ARRAY

Filed March 18, 1964 Sheet 1 of 6

INVENTOR.

Peter A. Denes

BY Wallenstein, Spangenberg & Hattis

Attys.

METHOD OF MAKING A MINIATURE MAGNETIC CORE MEMORY ARRAY

Filed March 18, 1964

INVENTOR.
Peter A. Denes
Wallenstein, Spangenberg & Hattis
Attys.

INVENTOR.
Peter A. Denes
BY Wallenstein, Spangenberg & Hattis
Attys.

INVENTOR.
Peter A Denes
BY Wallenstein, Spangenberg & Hattis Attys.

METHOD OF MAKING A MINIATURE MAGNETIC CORE MEMORY ARRAY

Filed March 18, 1964

INVENTOR.
Peter A. Denes
BY Wallenstein, Spangenberg & Hattis
Attys.

METHOD OF MAKING A MINIATURE MAGNETIC CORE MEMORY ARRAY

Filed March 18, 1964

INVENTOR.
Peter A. Denes
BY Wallenstein, Spangenberg & Hattis
Attys.

United States Patent Office 3,435,518
Patented Apr. 1, 1969

3,435,518

METHOD OF MAKING A MINIATURE MAGNETIC CORE MEMORY ARRAY

Peter A. Denes, 9101 Crestwood Ave. NE., Albuquerque, N. Mex. 87112

Filed Mar. 18, 1964, Ser. No. 352,919
Int. Cl. H01f *3/10, 7/06*
U.S. Cl. 29—604 11 Claims

ABSTRACT OF THE DISCLOSURE

A method of wiring magnetic cores for single or multi-planar magnetic core memory arrays. Green magnetic cores are placed on a wire and then fired. A suitable conductor is then attached to the wire so that when the wire is pulled through the cores, it will cause the conductor to be threaded through the inside of the cores.

The present invention relates to miniature magnetic core memory arrays or matrices commonly used to store information in computers and other data handling systems. The cores of such arrays are commonly made of a magnetic material having a generally rectangularly shaped hysteresis curve. The cores generally have one or more input windings which are pulsed with current and one or more output windings in which voltage pulses are induced when the input winding pulses have the duration and magnitude to drive the core from one direction of saturation to another. The windings of the cores in the arrays or matrices are commonly formed by common conductors stringing through a number of the cores.

It is well known that the various characteristics of the magnetic core units of the aforesaid arrays and matrices improve as the core dimensions decrease. For example, the squareness of the hysteresis loop and the signal to noise ratio of the core units increase with the decrease in the core dimensions, and the time required to switch the core between their opposite states of saturation decreases with the decrease in the core dimensions. Although the desirability of small cores has been well known, little success has been heretofore achieved in making magnetic core memory arrays utilizing small cores for a number of reasons including the great difficulty encountered in wiring the tiny cores.

One of the objects of the invention is to provide a new method of wiring magnetic cores of extremely small size independently of the particular use of the cores. Another object of the invention is to provide such a method which is particularly adaptable for making single or multi-planar magnetic core memory arrays. A related object of the invention is to provide a method as just described which is so simple that highly skilled personnel is not required to wire the cores and further wherein the method can be simply carried out by automatic machinery, if desired.

A further object of the invention is to provide a multi-planar magnetic memory core array which can be fabricated by the process of the present invention and which utilizes a minimum of input points to the memory array thereby decreasing the complexity thereof for a given number of cores in the array.

The present invention, for example, is useful in providing a multi-planar magnetic core memory array formed from annular cores having, for example, an inside diameter of 0.008 inch or less. Such cores are preferably fabricated by dipping wax coated rods several times into a slurry containing the desired ferrite material in a binder before the same is sintered to build up a coating of the ferrite material on the wax layer on each of the rods. The coatings on the rods are severed without cutting through the rods so that the integrity of the rods are not disturbed, to form individual cores of the desired length, and the wax layer is thereafter melted by heating to separate the individual cores from the rods.

An important aspect of the present invention is that the green cores produced by any known method are placed, as a part of the production of green cores, onto a wire to form a string of cores. This operation is easily possible, even with the smallest green cores, because their position is determined during the production by the producing equipment and no manual handling is needed. In case of compression molded cores, the dies do not eject the cores into the free air, but onto a wire brought centrally in contact with the die for this purpose. In case of cores made by the above described dipping method, the severed cores are pulled off the rods onto individual carrier wires made, for example, of noble metal which will not adhere or chemically interact with the ferrite core during the sintering process. This is most easily carried out by using hollow rods and stringing wires through the rods and then slipping the severed cores off the rods onto the carrier wires referred to. (As will appear, these wires become the means for drawing other wires through the cores which form the aforesaid input and output windings thereof.) The sintering of the raw ferrite cores is carried out preferably on specially constructed racks over which the core-carrying wires are supported in a taut condition. The racks are designed to ensure maximum tautness of the carrier wires during the sintering process to ensure the maintenance of precise dimensions of the cores which would be adversely affected if the wires sagged an appreciable extent. After the cores are sintered, it is advisable to test the cores before wiring them into the desired array. For this purpose a pair of test wires, one insulated and one bare, are preferably soldered, welded or otherwise secured to each carrier wire, and the test wires are threaded through the cores of each string of cores by pulling the end of the carrier wire remote from the end connected to the test wires through the cores involved. The cores are then tested by connecting the insulated wire to a suitable voltage test equipment, such as an oscilloscope, and the cores are energized by pulses which are applied across portions of the bare wire on opposite sides of each selected core. A defective core indicated on the test equipment is removed from the test wires by crushing the defective core and pulling it from the test wires.

The test wire pairs are each then preferably replaced by a single preferably non-magnetic wire by attaching the same to one end of one or both of the test wires referred to and pulling on the other end of the test wires to draw the non-magnetic wire through the string of cores involved. This wire represents an input or output winding for each of the cores involved. Other wires representing or constituting conductor windings can then be drawn through the cores in a preferred manner now to be explained.

Where a single plane magnetic core array is to be fabricated, a number of said non-magnetic wires equal to the number of columns (or rows) of cores in the array and each with a number of cores equal to the number of cores in each row (or column) of the array are supported in spaced parallel relation. A magnetic wire is then secured to the non-magnetic wire of one of the outer string of cores at the corresponding side of each of the cores of the string and the non-magnetic wire is pulled simultaneously to draw the magnetic wires to the opposite side of the cores involved. A magnet can then be used selectively to grab the magnetic wires and pull them away from the non-magnetic wires to provide easy access to the magnetic wires for severing the same from the non-magnetic wires. The magnetic wires are then subsequently welded or soldered to the non-magnetic wire of the adjacent string of cores at the appropriate places and then pulled through the latter string of cores to form a second winding for the second string of cores. This procedure is repeated to form additional windings for the other cores.

As previously explained, the method of the present invention makes it possible to utilize cores of extremely small size which results in greatly improved hysteresis squareness, signal to noise ratio and switching speed as compared to cores of normal size. The increased signal to noise ratio in particular makes possible the practical construction of a magnetic core memory array constituting another aspect of the invention wherein a minimum number of contact points to the array is achieved by using a maximum number of common conductors representing serially connected input and output windings. The fact, for example, that a particular output winding conductor passes through a large number of cores increases the noise pickup in the conductor involved, but this does not present too much of a problem where the cores have high signal to noise ratios made possible by the utilization of extremely small cores. Furthermore, as it will be shown by way of an example, the invention makes possible the insertion of the sensing wires in a preferred way in which they pick up only a small fraction of the generated noises.

Other objects, advantages and features of the invention will become apparent upon making reference to the specification to follow, the claims and the drawings wherein:

FIG. 1 is a perspective view of a multi-planar magnetic core memory array which is most advantageously constructed by the method of the present invention;

FIGS. 2 through 4 are respectively sectional views of the array of FIG. 1, taken respectively along the reference lines 2—2, 3—3, and 4—4;

Figure 1:
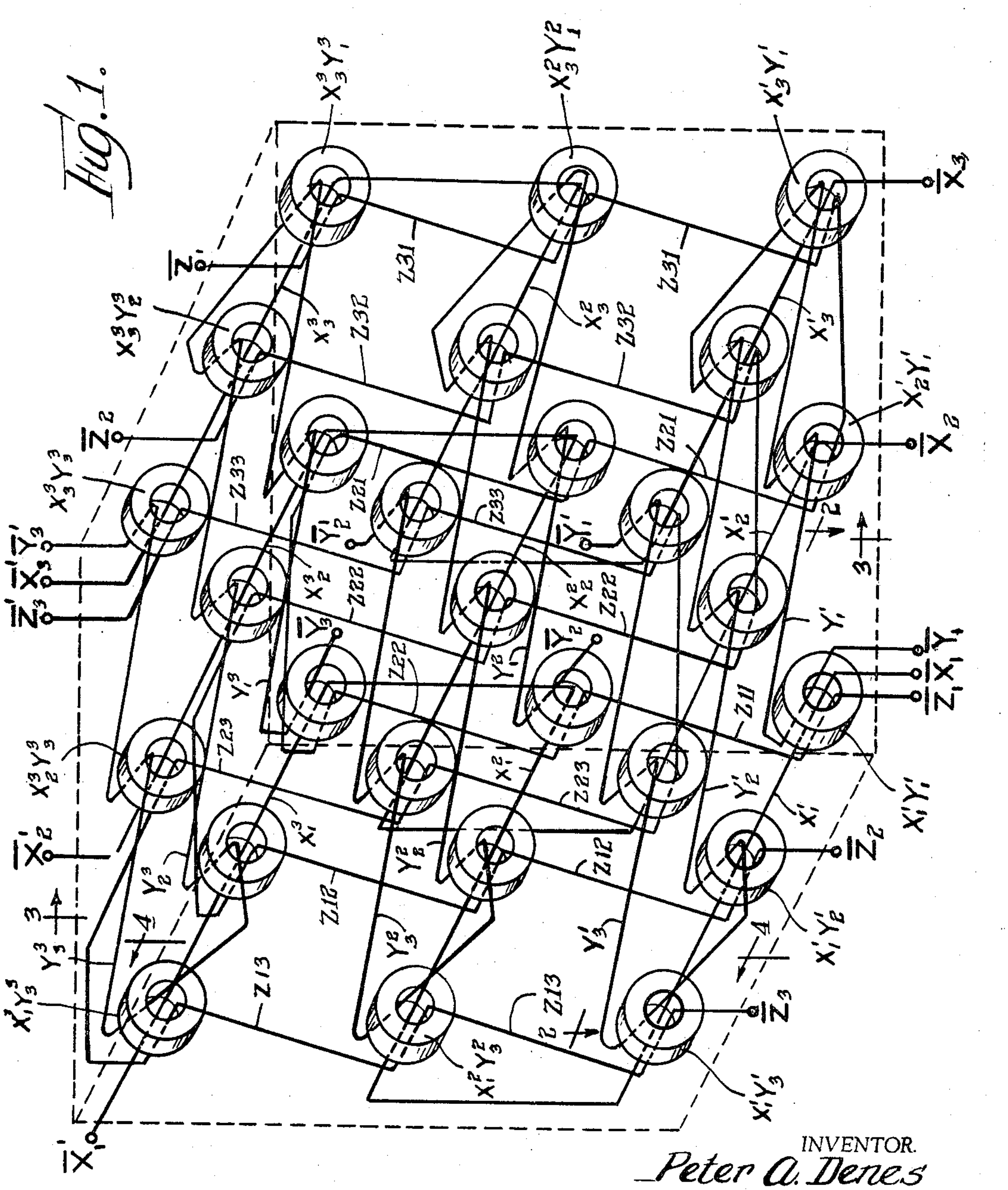
Figures 2, 3, 4:
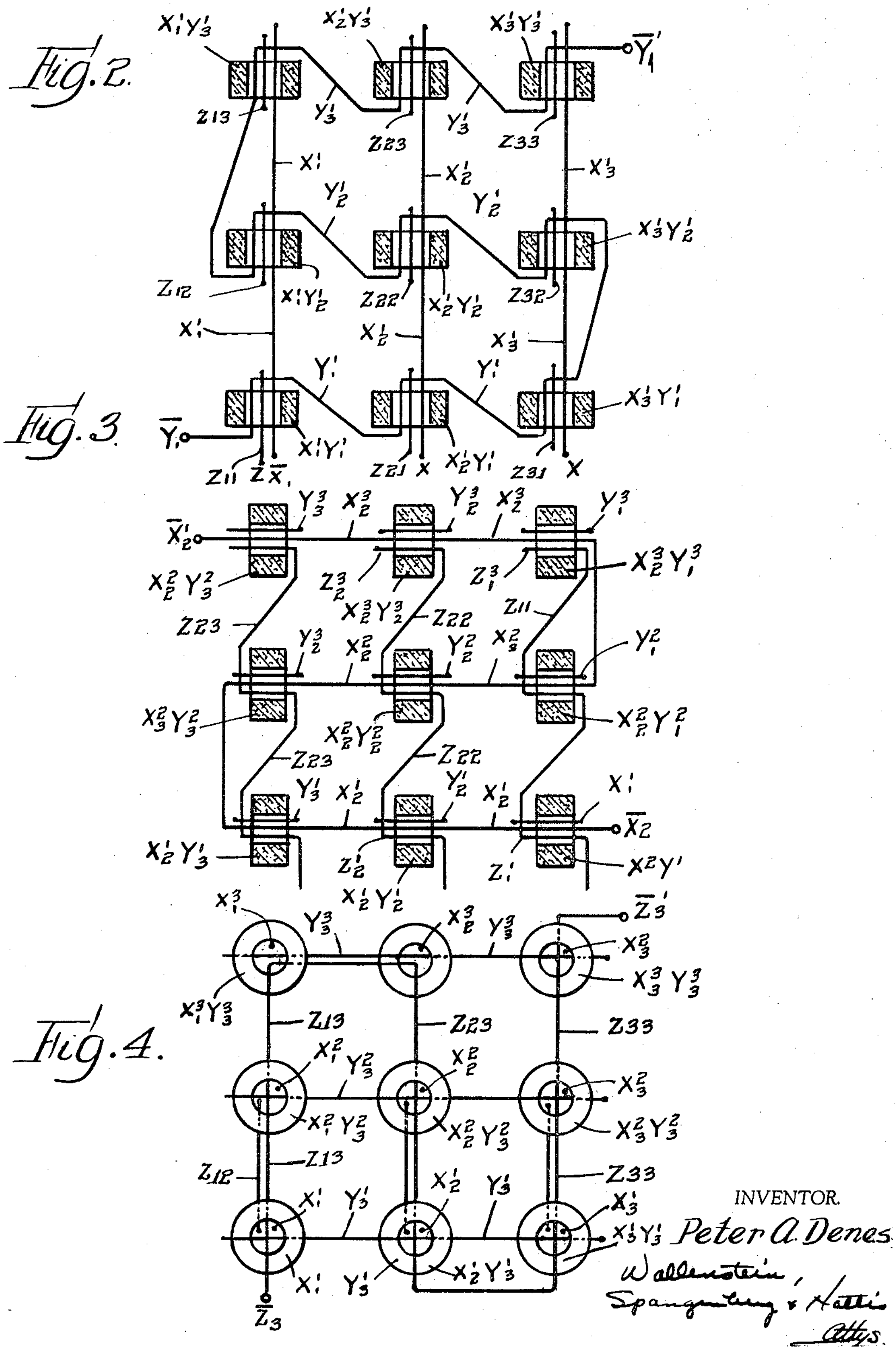
Figure 5:
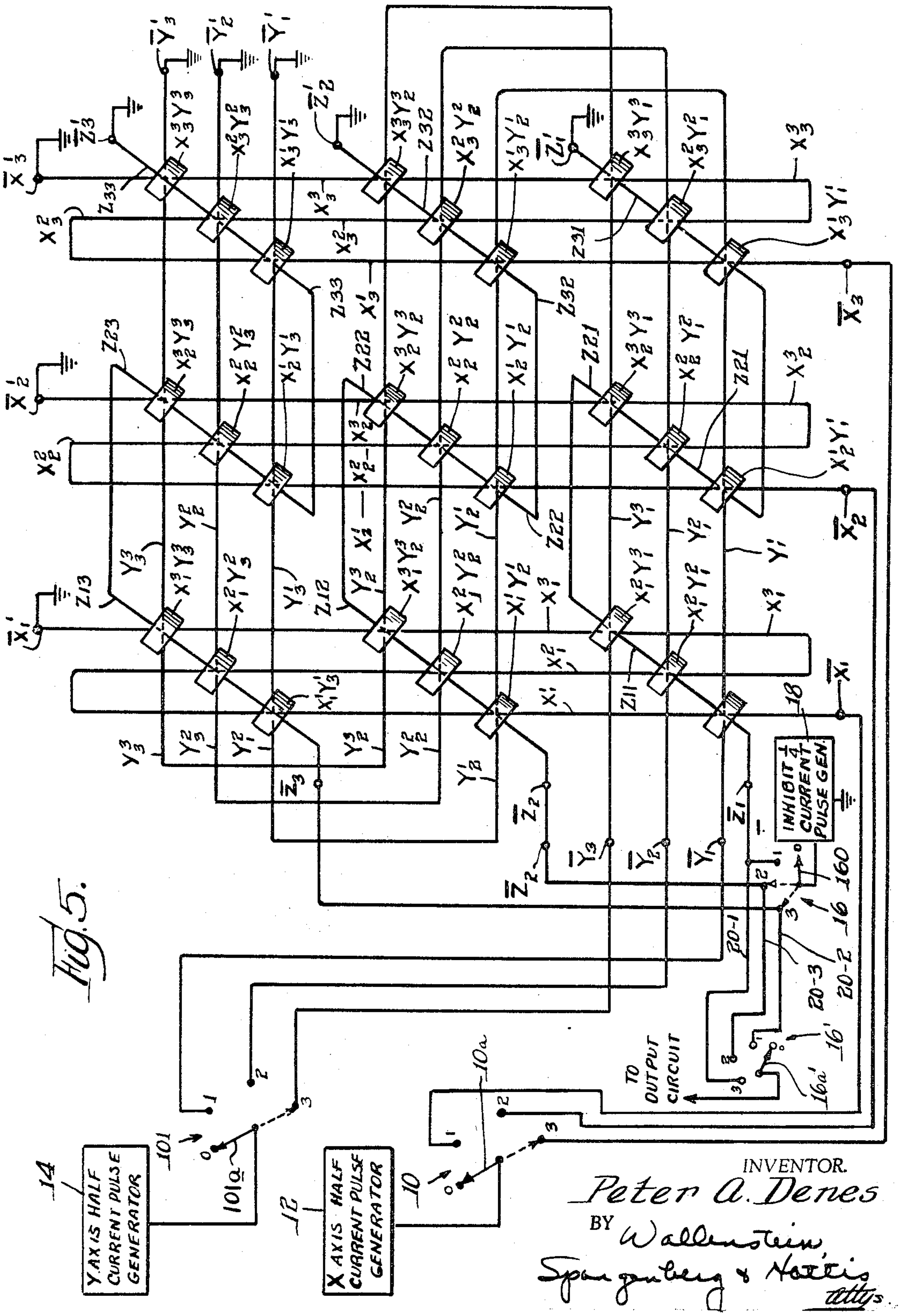
FIG. 5 is a diagrammatic view of the magnetic core memory array of FIG. 1 with exemplary connections thereof to various input and output circuits used to read information into and out of the array.
Figures 6, 6A:
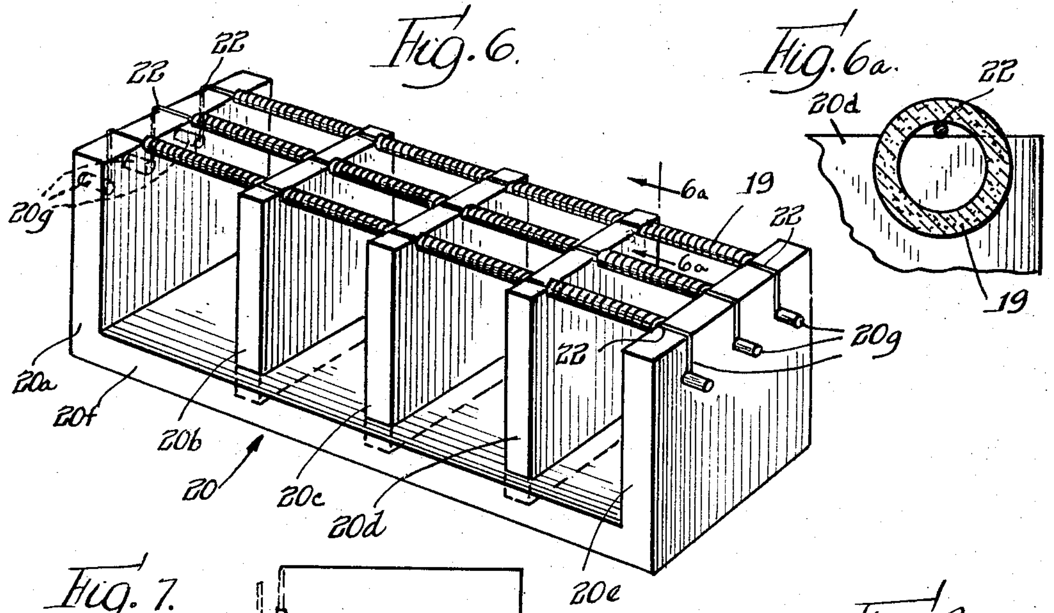
FIG. 6 is a perspective view illustrating a stand which supports strings of cores tautly during the sintering of raw ferrite cores in the process of making miniature cores for the array of FIG. 1.
Figure 7:
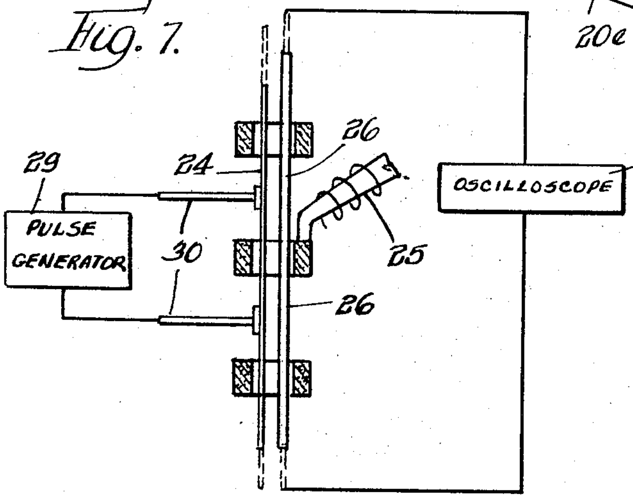
Figure 8:
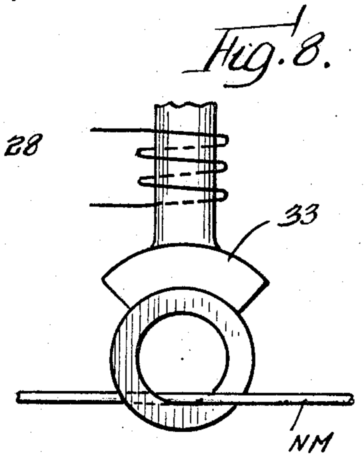
Figure 9:
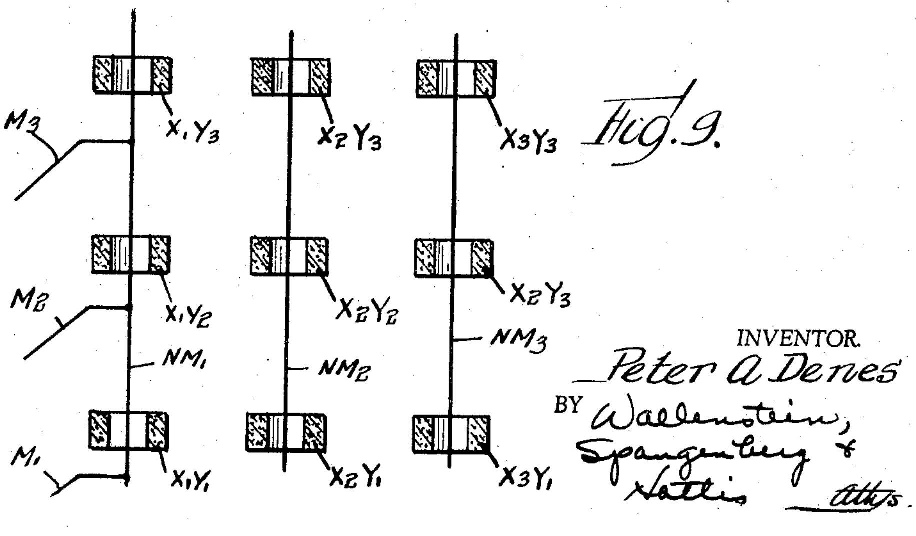
Figure 16:
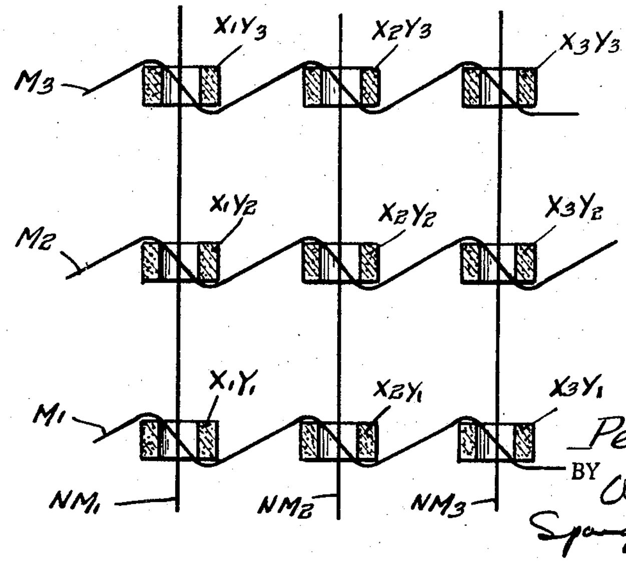
Figure 17:
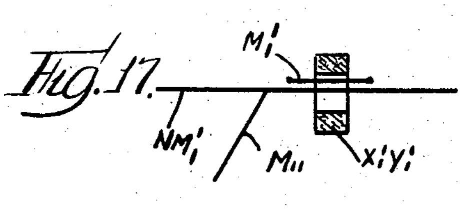
Figure 19:
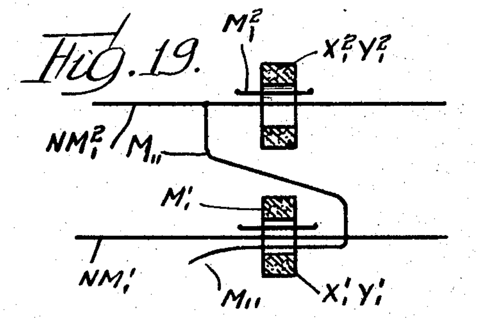
Figure 18:
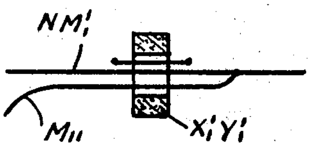

FIG. 6*a* is an enlarged fragmentary sectional view through the stand of FIG. 6, taken substantially along the reference line *6a*—*6a* in FIG. 6;

FIG. 7 is a view of a string of cores after the sintering operation is complete and through which a pair of wires have been pulled and respectively connected to an oscilloscope and a pulse generator for testing the individual cores of the strings;

FIG. 8 illustrates exemplary means for supporting individual cores during the wiring of the magnetic core memory array of FIG. 1;

FIG. 9 is a view of the arrangement of three strings of cores forming three columns of cores in one of the core planes of the array of FIG. 1 and supported in position to be strung with additional wires;

FIGS. 10 through 15 illustrate the steps which are carried out in the stringing of a wire through a core in one of the rows of cores shown in FIG. 9;

FIG. 16 shows the nine cores of FIG. 9 after completion of the initial wiring thereof;

FIGS. 17 through 19 illustrate the steps of stringing a wire through corresponding cores in two different planes of the three dimensional core memory array shown in FIG. 1; and FIGS. 20 through 24 illustrate the sequential steps for forming a complete winding loop through two cores in a modified magnetic core memory array.

EXEMPLARY MAGNETIC CORE ARRAY

The magnetic core memory array illustrated in the drawings is a three plane array with nine cores per plane arranged most advantageously in orthogonal rows and columns of three cores in each row and column. The corresponding cores in the various rows and columns of the three planes of the array are most advantageously in vertical alignment. The cores are identified in the drawings by reference characters X and Y and with subscript numbers related to the X and Y half current input conductors passing therethrough and superscript numbers identifying the particular plane of the array in which the cores are located. An X axis half current conductor extends through each of the cores in the same column in each plane of the array, and each such conductor is identified by the main reference character X with a subscript number corresponding to the numbers 1, 2 or 3 of the row in which the cores involved are located and a superscript number 1, 2 or 3 corresponding to the plane in which the cores involved are located, and a superscript number 1, 2 or 3 corresponding to the horizontal plane in which the cores involved are located. Similarly a Y half current conductor extends through the core in each row of cores in each plane of the array. Each Y half current conductor is identified by the reference character Y with a subscript number 1, 2 or 3 corresponding to the row and a superscript number 1, 2 or 3 corresponding to the plane in which the cores involved are located. A Z axis output conductor extends through corresponding vertically aligned cores in the various planes of the array. Each Z axis output conductor is identified by the reference character Z with two subscript numbers, the first identifying the column and the second identifying the row in which the cores involved are located.

There are thus in each plane of the array, three X axis half current, three Y axis half current and nine Z axis output conductors.

In accordance with one aspect of the present invention, the various X, Y and Z conductors passing through the various cores are connected in series in such a way as to provide a minimum number of usable input and output points to the matrix. To this end, in the illustrated embodiment of the invention, the X half current conductors in the same No. 1 columns of the various planes of the array are connected in series across a pair of input terminals $X_1$—$X_1'$. Likewise, the $X_2$ half current conductors in the same No. 2 columns of the various planes of the array are connected in series between a pair of input terminals $X_2$—$X_2'$. Similarly, all of the $X_3$ half current conductors in the No. 3 columns of the various planes of the array are connected in series between a pair of input terminals $X_3$—$X_3'$.

The Y half current conductors in the bottom No. 1 plane of the array are connected in series between a pair of input terminals $Y_1$—$Y_1'$. The Y half current conductors of the middle No. 2 plane of the array are connected in series across a pair of input terminals $Y_2$—$Y_2'$. The Y half current conductors in the upper No. 3 plane of the array are connected in series across a pair of input terminals $Y_3$—$Y_3'$.

The Z output conductors $Z_{11}$—$Z_{21}$—$Z_{31}$ which are in the forwardmost vertical plane of the array (viewed in FIG. 1) are connected in series across a pair of input terminals $Z_1$—$Z_1'$, the Z output conductors $Z_{12}$—$Z_{33}$—$Z_{32}$ in the same intermediate vertical plane of the array are connected in series across a pair of input terminals $Z_2$—$Z_2'$, and the Z output conductors $Z_{13}$—$Z_{23}$—$Z_{33}$ in the rearwardmost vertical plane of the array are connected in series across a pair of input terminals $Z_3$—$Z_3'$.

In the particular circuit illustrated in the drawing, all of the primed input and output terminals $X_1'$—$X_2'$—$X_3'$, $Y_1'$—$Y_2'$—$Y_3'$ and $Z_1'$—$Z_2'$—$Z_3'$ are respectively grounded terminals.

The manner in which the various individual X, Y and Z conductors are connected in series with the various $\overline{X}_1—\overline{X}_2—\overline{X}_3$, $\overline{Y}_1—\overline{Y}_2—\overline{Y}_3$ and $\overline{Z}_1—\overline{Z}_2—\overline{Z}_3$ terminals of the array can be summarized as follows:

$$\overline{X}_1=X_1^1+X_2^1+X_3^1$$
$$\overline{X}_2=X_2^1+X_2^2+X_2^3$$
$$\overline{X}_3=X_1^3+X_2^3+X_3^3$$

$$\overline{Y}_1=Y_1^1+Y_1^2+Y_1^3$$
$$\overline{Y}_2=Y_1^2+Y_2^2+Y_3^2$$
$$\overline{Y}_3=Y_1^3+Y_2^3+Y_3^3$$

$$\overline{Z}_1=Z_{11}+Z_{21}+Z_{31}$$
$$\overline{Z}_2=Z_{12}+Z_{22}+Z_{32}$$
$$\overline{Z}_3=Z_{13}+Z_{23}+Z_{33}$$

Or, in the general case having $n^3$ cores in the array:

$$\overline{X}_k=X_1^k+X_2^k+ \ldots +X_n^k \ (k=1,2, \ldots , n)$$
$$\overline{Y}_k=Y_1k+Y_2^k+ \ldots +Y_n^k \ (k=1,2, \ldots , n)$$
$$\overline{Z}_k=Z_{1k}+Z_{2k}+ \ldots +Z_{nk} \ (k=1,2, \ldots , n)$$

An array having $n^3$ cores thus has only $6n$ connections, each $2n$ for the $\overline{X}$, $\overline{Y}$ and $\overline{Z}$ terminals. The $\overline{X}$ and $\overline{Y}$ terminals carry the half current pulses in accordance with the well known coincidental current memory principle.

As is conventional in magnetic core memory arrays, to read information into or out of a given core half current pulses of a given polarity must be simultaneously fed to the X and Y conductors associated with the core involved in a direction to drive the core to the same predetermined state of saturation. If the magnetomotive force produces a change in the magnetic flux of the core, a pulse will be generated in the Z conductor passing through that core. When information is being read out of the array, this pulse is utilized by output devices connected to the Z output terminals associated with the particular core involved.

Means is provided for selectively feeding half current pulses to the appropriate $\overline{X}$ and $\overline{Y}$ signal input terminals for storing information in or reading information out of the array. This may be accomplished by means of a mechanical (or electronic) switch 10 which, as illustrated, has four stationary contacts 0, 1, 2 and 3. Contacts numbers 1, 2 and 3 are respectively connected to the input terminals $\overline{X}_1$, $\overline{X}_2$ and $\overline{X}_3$. The switch 10 has a wiper contact 10*a* adapted to make selective engagement with the contacts 0 through 3. The wiper 10*a* is connected to the output of a suitable source of half current pulses 12.

Another mechanical (or electronic) switch 101 is provided which, as illustrated, has four stationary contacts 0, 1, 2 and 3. Stationary contacts 1, 2 and 3 are respectively connected to the input terminals $\overline{Y}_1$, $\overline{Y}_2$ and $\overline{Y}_3$. The switch 101 has a wiper 101*a* adapted to make selective engagement with any of the contacts 0 through 3. The wiper 101*a* is connected to a half current pulse source 14 whose pulses are synchronized with the pulses generated by the pulse source 12. It is apparent that by properly positioning the wipers 10*a* and 101*a* that a particular core in the selected row and column of the array can be selected for read-in or read out purposes. However, due to the manner in which the X, Y and Z conductors are connected in series, there will be an additional core which simultaneously receives half current pulses which produce aiding magnetomotive forces. The core which is not selected is located in each instance, however, in a part of the array which has a different Z axis conductor than the selected core. The unwanted core is made non-responsive to the half current pulse by feeding an inhibit pulse each having an amplitude less than the half current value which will reduce the net magnetomotive force on the unwanted core necessary to drive the core to saturation and will be less than the magnitude required to switch another core having only one-half current pulse fed thereto which produces a magnetomotive force in the same direction as the inhibit pulse. To this end, the $\overline{Z}_1$, $\overline{Z}_2$, and $\overline{Z}_3$ terminals of the array may be respectively connected to a section 16 of a multiple mechanical (or electronic) switch which, as illustrated, has contacts 0, 1, 2 and 3. Contacts 1, 2 and 3 are respectively connected to the $\overline{Z}_1$, $\overline{Z}_2$ and $\overline{Z}_3$ terminals. The switch 16 has a wiper 16*a* adapted to make selective contact with any of the contacts 0 through 3. The wiper 16*a* is connected to the output of an inhibit one quarter current pulse generator 18 which generates pulses at one-half the amplitude of the half current pulse generators 12 and 14.

The $\overline{Z}_1$, $\overline{Z}_2$ and $\overline{Z}_3$ output terminals are also connected by conductors 20–1, 20–2 and 20–3 to a second section 16' of the mechanical (or electronic) switch, having a wiper 16*a'* and contacts 0, 1, 2 and 3. Conductors 20–1, 20–2, and 20–3 are respectively connected to terminals 3, 2 and 1 so that as the wipers 16*a* and 16*a'* are operated simultaneously the output terminal not used for inhibit purposes is fed through wiper 16*a'* to the output circuit so that the output of the interrogated core is read out from the matrix.

The need for the inhibiting pulses can best be understood by specific examples. Thus consider that we wish to switch the core $X_2^3Y_3^2$. For this purpose we send half current pulses through terminals $\overline{X}_2$ and $\overline{Y}_2$, in the direction that they add up in core $X_2^2Y_3^2$ to switch it. We use $\overline{Z}_3$ as a sensing terminal. Terminal $\overline{Z}_3$ registers the switching signal voltage of core $X_2^2Y_3^2$. However, it picks up the noise voltage of the following cores: in the crossing line of the planes associated with terminal $\overline{X}_2$ and terminal $\overline{Z}_3$, of the cores $X_2^1Y_3^1$ and $X_2^3Y_3^3$, or, in the general case, of the cores $X_2Y_3^k$ ($k=1, 3, 4, \ldots , n$; $k=2$ that being the switched core); further, in the crossing line of the planes defined by $\overline{Y}_2$ and $\overline{Z}_3$, of the cores $X_1^2Y_3^2$ and $X_3^2Y_3^2$, or, in the general case, of the cores $X_k^2Y_2^3$ ($k=1,3,4, \ldots , n; k=2$).

These noises cancel each other with the possible maximum exception of two noise voltages in each series. In two neighboring cores $X_2^kY_3^k$ and $X_2^{k+1}Y_3^{k+1}$ the sensing wires $Z_{23}$ has the same direction; however, the direction of the half current pulse in wire $X_2^k$ is opposite to the direction of the half current pulse in wire $X_2^{k+1}$, hence the induced noise voltages are opposite in the wire $Z_{23}$ and grossly cancel each other. Similarly, in two neighboring cores $X_k^2Y_3^2$ and $X_{k+1}^2Y_2^3$ the half current pulse flowing through the wire $Y_3^2$ has the same direction; however, one is generating a noise voltage in wire $Z_{k,3}$ and the other in wire $Z_{k+1,3}$ which flow in opposite directions and grossly cancel each other.

The half of the remaining $\overline{Z}$ terminals are used for inhibition of unwanted switching of cores. If no inhibition would be applied, sending half current pulses through terminals $\overline{X}_2$ and $\overline{Y}_2$, besides the core $X_2^2Y_3^2$, the core $X_2^2Y_1^2$, and in the general case, all cores $$X_2^2Y_{2k+1}^2 \left((k=0,2,3, \ldots ; k<\frac{n}{2}\right)$$

would switch, because the two half current pulses flow in these cores in the same directions, while in the cores $$X_2^2Y_{2k}^2 \left(k=0,2,3, \ldots ; k<\frac{n+1}{2}\right)$$

the two half current pulses flow in the opposite directions and cancel each other.

Hence we use the terminals $\overline{Z}_1$, respectively in the general case, the terminals $$\overline{Z}_{2k+1} \left(k=0,2,3, \ldots ; k<\frac{n}{2}\right)$$

for inhibition and we send a current pulse through them which is only half of the half current pulses in terminals $\overline{X}_2$ and $\overline{Y}_2$ and is of opposite direction to them when they flow through the cores $$X_2^2Y_{2k+1}^2 \left(k=0,2,3, \ldots ; k<\frac{n}{2}\right)$$

Consequently, these cores receive only three quarters of the pulse value which would be necessary to switch them and they remain in their original state.

The one fourth inhibiting current pulse causes no switching in the other cores being in the core planes associated with the terminals $$\overline{Z}_{2k+1}\left(k=0,2,3,\ldots;k<\frac{n}{2}\right)$$

either; the total current pulse in them is either one fourth or three quarter, less than needed for switching. Among the cores being in the crossing lines of the core planes associated with terminals $$\overline{X}_2 \text{ and } \overline{Z}_{2k+1}\left(k=0,2,3,\ldots;k<\frac{n}{2}\right)$$

the cores $$X_2^{2i+1}Y_{2k+1}^{2i+1}\left(i=0,1,2,\ldots;i<\frac{n}{2}\right)$$

get ¾ current pulse and the cores $$X_2^{2i}Y_{2k+1}^{2i}\left(i=0,1,2,\ldots;<\frac{n+1}{2}\right)$$

get ¼ current pulse.

Similarly, among the cores being in the crossing lines of the planes defined by terminals $\overline{Y}_2$ and terminals $$\overline{Z}_{2k+1}\left(k=0,2,3,\ldots;k<\frac{n}{2}\right)$$

the cores $$X_{2i+1}^{2}Y_{2k+1}^{2}\left(i=0,1,2,\ldots;i<\frac{n}{2}\right)$$

get ¾ current pulse and the cores $$X_{2i}^{2}Y_{2k+1}^{2}\left(i=0,1,2,\ldots;i<\frac{n+1}{2}\right)$$

get ¼ current pulse.

The system represents a memory array with minimum connecting points, actually, the ratio of connection to bits is $6/n^2$ which is a very small number if $n$ is growing.

METHOD OF MAKING MINIATURE MAGNETIC CORE ARRAY

As previously indicated, it is extremely beneficial that the cores of the array of FIG. 1 be made of miniature cores. To this end, refer now to FIGS. 6 through 19 for an explanation of the method aspects of the invention by means of which the magnetic core memory array can be fabricated of miniature cores which are impractical to wire using conventional core wiring techniques. In the preferred method, at least one wire is inserted into the cores during their initial fabrication where their position is precisely defined. During any further wiring operation, at least one wire will always be kept inside the cores so that other wires can be drawn therethrough to be used as various stages in the fabrication of the array in a preferred manner to be explained.

In the example now to be described it will be assumed that each miniature core has an outside diameter of 0.012 inch, an inside diameter of 0.007 inch and a length of 0.003 inch. (The particular dimensions of the miniature core, however, are unimportant to the invention.)

In one known method of making magnetic cores, the cores are fabricated by dipping a wax coated rod several times into a slurry containing the memory ferrite material in a binder, to build up a coating of the desired thickness on the wax layer. The ferrite coating is then severed to form individual cores of the desired lengths, and the wax layer is melted by heating to separate cores from the rod. The cores are then pulled off the rod and sintered individually. In accordance with the present invention, the wax coated rod is preferably a hollow rod and, instead of pulling the cores off into free space, a wire is threaded through the hollow rod and the cores are then removed from the hollow rod onto a metal support wire which becomes, among other things, a support for the cores during the sintering thereof by firing in an oven. The support wire may be a noble metal wire like platinum or rhodium, or any other metal which does not stick to or otherwise chemically affect the cores during the sintering operation.

It is also advantageous to adjust the exact outside diameter of the coated rod on a centerless grinder. In this way, all the dimensions of the green cores are exactly controlled. The inside diameter equals the diameter of the wax coated rod metal. The outside diameter is controlled by the grinding. The length of the cores is defined by the spacing of the cutting blades.

A number of noble metal wires 22 on which the green cores 19 have been strung are tautly supported on a rack or stand 20 comprising a number of vertical, horizontally spaced walls 20*a*, 20*b*, 20*c*, 20*d* and 20*e* extending upwardly from a base 20*f*. The wires are stretched over the ends of the spaced walls and are anchored on studs 20*g* extending outwardly from the end walls 20*a* and 20*e*. The rack is then placed in a suitable oven for firing to sinter the green ferrite cores following well known core making practice. After the firing operation, the core carrying noble metal wires 22 are taken off the rack 20 and a pair of wires 24 and 26 are preferably welded to one end of each wire. The wire 24 (FIG. 7) is a bare copper wire and the wire 26 is an insulated copper wire. The two copper wires 24 and 26 are then pulled through the cores by pulling on the other end of the noble metal wire 22 to draw the pair of copper wires through the string of cores involved.

The copper wires 24 and 26 are used to test the cores. To this end, the insulated wire 26 of each string of cores being tested is connected to a suitable voltage waveform indicating instrument 28, such as an oscilloscope. The bare copper wire 24 serves as a means for sending magnetizing current pulses through individual selected cores. An electromagnetically or vacuum operated device 25 is placed against a selected core which is pulled thereby into a measuring area. A source 29 of magzetizing current pulses capable of driving the cores between extremes of saturation is provided to which source a pair of output probes 30—30 are connected. The probes are placed against the bare copper wire 24 on opposite sides of the core to be tested to apply the current pulses to that part of the wire 24 passing through the selected core. Voltage pulses are induced into the insulated wire 26 which appear on the oscilloscope. The quality of the core can be determined by the waveform of the pulses in the manner well known in the art. If the magnetic characteristics of a particular core are not satisfactory, the bad core is merely crushed and removed from the string of cores involved. Upon the completion of the testing of a given string of cores, only good cores remain around the copper wires 24 and 26. By attaching a suitable wire to one of the ends of one or both of the two wires 24 and 26 and pulling the other end of the wires 24 and 26, the former wire can be drawn through any desired number of cores to form a basic string of cores to be used in the fabrication of the magnetic core memory array. In the particular example of the invention being described, where there are nine cores in each plane of the array, the cores are formed into individual strings of three cores each where each string represents, for example, a column of cores through which extends a carrier wire representing an X axis conductor.

In most cases, the wiring of very small cores is easily possible, if at least one wire is already inserted in the core. The core then can be held firmly by an electromagnetic support yoke 33 shown on FIG. 8, and pulled out against the already inserted wire NM which is nonmagnetic in our example, not to be attracted by the field of the yoke 33. The core, being held in this way in a firm position, can be threaded with further wires, according to the desired pattern.

However, in the preferred embodiment of the present invention in which no manual insertion of wires is necessary to form the memory array, each new wire is pulled into the cores by wires already inside of the cores. This eliminates manual inserting operations and can be easily mechanized. This method will be described with help of the chosen example in which three cores are in a string and in which a non-magnetic wire NM was substituted for the test wires, being pulled in by the latter ones.

Each non-magnetic wire is represented in FIG. 9 by reference characters NM followed by a number 1, 2 or 3 identifying the associated column of cores. FIG. 9 shows the cores in one of the horizontal planes of the array supported in position for wiring. The non-magnetic wires NM, for example, may have a diameter of 0.003 inch or less and may be made of stainless steel. In determining the diameter of the various wires to be strung through the cores, it should be taken into consideration that pulling the wire through the core should not injure the same.

Figure 10:
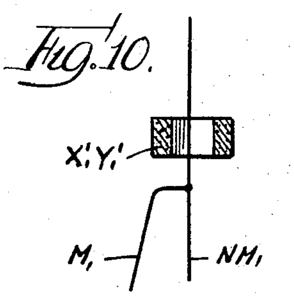
Figure 11:
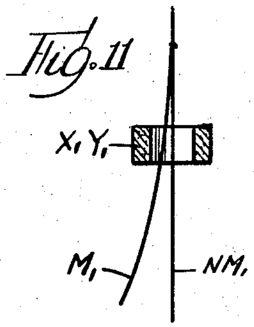
Figure 12:
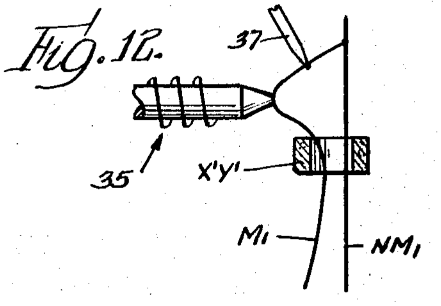
Figure 13:
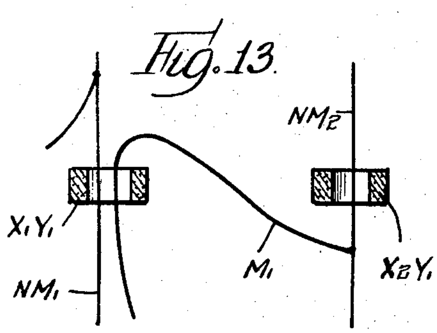
Figure 14:
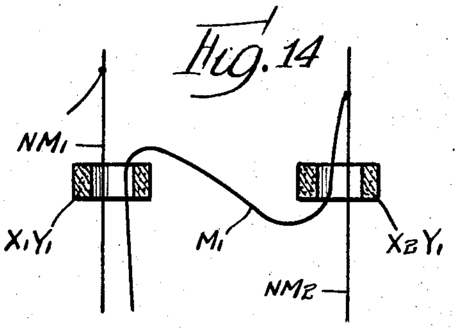
Figure 15:
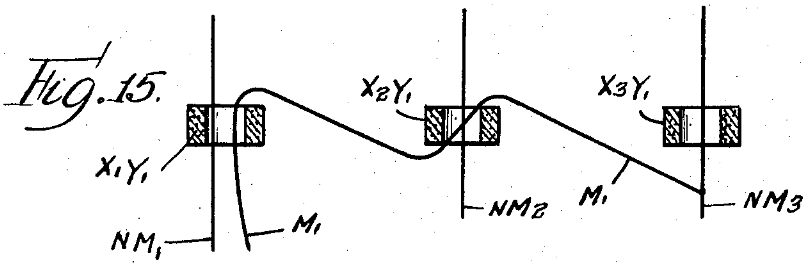

Magnetic wires $M_1$, $M_2$ and $M_3$ are welded or otherwise suitably connected to one of the outer non-magnetic wires $NM_1$ on the same side of the respective cores $X_1Y_1$, $X_1Y_2$ and $X_1Y_3$ in each plane of the array. Each non-magnetic wire $NM_1$ is then pulled to bring the magnetic wires to the opposite side of the adjacent cores. This step is illustrated in FIGS. 10 and 11 which shows the magnetic wire $M_1$ being pulled through the associated core $X_1Y_1$. An electromagnet 35 is then utilized to pull each of the magnetic wires $M_1$, $M_2$ or $M_3$ away from the associated non-magnetic wire $NM_1$ at its point of contact therewith so that the magnetic wires can be readily severed from the non-magnetic wire by a suitable cutting tool 37 without damage to the non-magnetic wire. Each severed wire is then brought into engagement by the electromagnet with and welded to the non-magnetic wire $NM_2$ (see FIG. 13) of the adjacent string of cores on the same side of the corresponding core of the string of cores involved as the magnetic wire was originally positioned when it was first connected to the non-magnetic wire $NM_1$.

In the manner just explained, the magnetic wires $M_1$, $M_2$ and $M_3$ are pulled through the associated cores of the second string of cores by pulling on the end of the non-magnetic wire $NM_2$. The electromagnet 35 is again used to pull the wires $M_1$, $M_2$ and $M_3$ transversely away from the non-magnetic wire $NM_2$ where the magnetic wires are severed in the manner explained by the cutting tool 37. The magnetic wires $M_1$, $M_2$ and $M_3$ are then strung through the corresponding cores of the third string of cores in the same manner just explained in connection with the second string of cores to provide the X and Y axis core wiring illustrated in FIG. 16 for each plane of the core.

The next step in the process of fabricating the magnetic core array is to string the Z conductors through the vertically aligned cores in the various planes of the array. This process is illustrated in FIGS. 17 through 19 for one pair of vertically spaced cores. First, magnetic wires are attached to each of the non-magnetic wires $NM_1^1$, $NM_2^1$ and $NM_3^1$ in the bottom (or upper) plane of the array adjacent to and on the same side of each of the cores in such plane. (FIGS. 17 through 19 illustrate the connection of one of the magnetic wires $M_{11}$ to the magnetic $NM_1^1$ wire adjacent to the core $X_1^1Y_1^1$.) There will, therefore, be nine such magnetic wires attached to the non-magnetic wires referred to in the bottom plane of the array. Then, the various non-magnetic wires $NM_1^1$, $NM_2^1$ and $NM_3^1$ are pulled through the core to bring the various magnetic wires, such as $M_{11}$ (see FIG. 18), to the opposite side of the cores. The latter magnetic wires are then severed from the non-magnetic wires $NM_1^1$, $NM_2^1$ and $NM_3^1$ in the same manner explained above by using an electromagnet 35 and a cutting tool 37. Each of the cores in the bottom plane of the array now have three individual wires strung therethrough.

The magnetic wires (like $M_{11}$ in FIGS. 17 through 19) which have just been strung through the cores involved are then brought into engagement with and welded to the non-magnetic wire (such as $NM_1^2$ in FIG. 19) in the corresponding column of the intermediate plane of the array at the same side of the corresponding cores involved as the wires were initially placed as shown in FIG. 17 when they were strung through the cores in the bottom plane of the array. The magnetic wires (such as $M_{11}$) are then pulled through the adjacent cores by pulling on the end of the various non-magnetic wires (such as $NM_1^2$) in the intermediate plane of the array. The magnetic wires are then severed from the non-magnetic wires to which they are attached by using the electromagnet 35 and the cutting tool 37 in the same manner previously described. If additional wires are to be strung through the cores, the non-magnetic wire NM is made sufficiently long that it remains within all of the cores as it is pulled back and forth therethrough.

The various wires which extend between the corresponding cores in the bottom and intermediate planes of the array are then strung through the corresponding cores in the upper plane of the array using the identical operations just described and shown in FIGS. 17 through 19.

Figure 20:
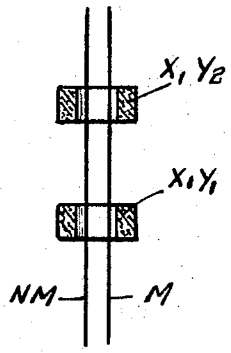
Figure 21:
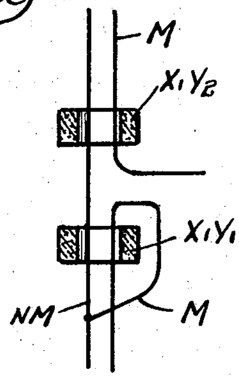
Figure 22:
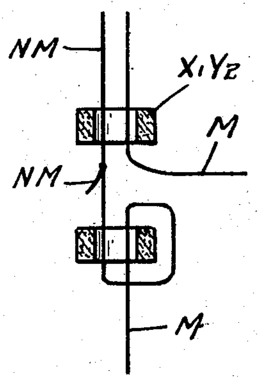

The present invention can also be utilized to loop wires around various cores in an array and this is illustrated in FIGS. 20 through 24. In FIG. 20, a pair of cores $X_1Y_1$ and $X_1Y_2$ are shown with a magnetic wire M and a non-magnetic wire NM strung therethrough. First, the magnetic wire M is severed at a point between the cores involved. One of the severed ends of the magnetic wire M is then brought around to the outer side of the core $X_1Y_1$ by the electromagnet 35 where it is welded to the non-magnetic wire NM as illustrated in FIG. 21. The non-magnetic wire NM is then pulled to bring the welded point of the magnetic wire M through the core as shown in FIG. 22 and the end of the non-magnetic wire is severed from the magnetic wire leaving only the magnetic wire within the core $X_1Y_1$.

Figure 23:
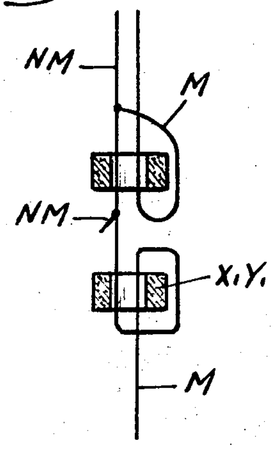
Figure 24:
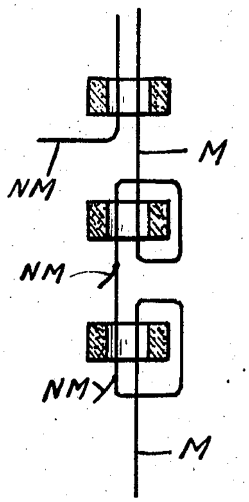

To form a loop of the magnetic wire M through the other core $X_1Y_2$, the unused severed end of the magnetic wire M is then brought around to the outer side of the core $X_1Y_2$ by the electromagnet 35 where it is welded to the non-magnetic wire NM as illustrated in FIG. 23. The end of the non-magnetic wire NM positioned between the cores $X_1Y_1$ and $X_1Y_2$ is then pulled to bring the end of the magnetic wire M which has just been welded to the non-magnetic wire NM through the core to complete the looping of the magnetic wire M through the core $X_1Y_2$. The non-magnetic wire NM is then severed from the magnetic wire as shown in FIG. 24.

Since the various magnetic and non-magnetic wires illustrated in FIGS. 17 through 24 may not be good electrical conductors of electricity, it may be desirable to replace these wires by copper conductors, for example. This is simply achieved by attaching a small gauge copper conductor to the end of the magnetic or non-magnetic wire involved, and then drawing the other end of the wire through the string of cores involved to pull the copper conductor into the same path previously occupied by the magnetic or non-magnetic wire involved.

The particular magnetic core array constructed in accordance with the invention just described is completed by permanently fixing the relative positions of the various cores which are strung in accordance with the method just described. The permanent fixing of the cores can be accomplished in a number of ways as, for example, by embedding the cores in a suitable synthetic plastic material, such as an epoxy resin, in a manner well known in the art.

It is apparent that the present invention has provided a highly unique multi-planar magnetic core array having a minimum number of input and output terminals, and also a highly unique and simple method of making such arrays using miniature cores.

It should be understood that numerous modifications may be made in the exemplary array and method for making the same described above without deviating from the broader aspects of the invention. Thus, it is also apparent that the steps described in connection with the exemplary array make the wiring of mostly any conceivable memory core arrays possible. In the above example, the placing and crossing of wires in any direction and in any combination was described and the production of turns around the core was disclosed. In all these examples no manual inserting of the wires into the cores was needed, thus making the production of memory arrays of any system using extremely small memory toroids possible.

What I claim as new and desire to be protected by Letters Patent of the United States is:

1. A method of making miniature magnetic core memory elements having at least one conductor passing therethrough, said method comprising the steps of: forming a coating of a green magnetic ferrite material on a rod, severing the coating at axially spaced points to provide individual annular magnetic ferrite core elements, slipping the core elements off the rod onto a first wire to form a string of cores, the wire being made of a material which can withstand firing of the ferrite without sticking or contaminating the same, firing the raw ferrite core elements while supported on said wire, and subsequently attaching a conductor to an end of said first wire and pulling the first wire through said cores to bring the conductor inside said cores.

2. A method of stringing at least two conductors through a miniature annular magnetic core, said method comprising placing the annular core around a non-magnetic wire, connecting a magnetic wire to said non-magnetic wire on one side of the core, pulling the non-magnetic wire to bring the magnetic wire through to the other side of the core, placing the point of the magnetic wire contiguous to the non-magnetic wire in a magnetic field which pulls the same transversely of the non-magnetic wire, severing the magnetically held magnetic wire at a point contiguous to said non-magnetic wire, and respectively connecting conductors to the ends of said non-magnetic and magnetic wires and pulling the non-magnetic and magnetic wires through the core to bring the conductors therethrough.

3. A method of stringing a pair of wires through at least two miniature annular magnetic cores, said method comprising the steps of: placing the pair of cores respectively around separate non-magnetic wires, connecting a magnetic wire to one of the non-magnetic wires on one side of the core thereon and pulling the non-magnetic wire to draw the magnetic wire to the other side of the core, then pulling the magnetic wire transversely away from the non-magnetic wire at a point contiguous to its point of connection to the non-magnetic wire by applying a magnetic field thereto and severing the same adjacent to said point, connecting the severed magnetic wire to the other non-magnetic wire at a point on one side of the associated core, and pulling the non-magnetic wire through the latter core to draw the magnetic wire through to the other side of the core, then pulling the magnetic wire transversely away from the non-magnetic wire at a point contiguous to its point of connection to the other non-magnetic wire by applying a magnetic field thereto and severing the same adjacent to said point.

4. A method of making a magnetic core memory array including orthogonal row and columns of annular magnetic core elements, each magnetic core element having X and Y axis conductors passing therethrough, said method comprising the steps of: stringing a plurality of annular magnetic core elements over each of a number of bare wires to form individual strings of core elements, the number of core elements in each string of core elements being equal to the number of columns of core elements in the array, supporting the strings of core elements in spaced relationship with the strings of core elements being parallel to one another, said wire of each string of core elements representing an X axis conductor, connecting a series of wires each representing the Y axis input conductor to one of the aforesaid X axis wires associated with one of the outermost strings of core elements at respective points located on the same sides of the respective core elements of the string involved, pulling the X axis wire through the associated string of core elements to pull the Y axis wires connected thereto through the adjacent core elements, then severing each of said Y axis wires from said Y axis wires on said other sides of the core elements, drawing said severed Y axis wires into engagement with the X axis wire of the adjacent string of core elements at points corresponding to the points of connection thereof to said X axis wire of the first-mentioned string of core elements, pulling the X axis wire of the adjacent string of core elements in a direction to bring the Y axis wires through the adjacent core elements to the opposite side of the core elements, severing the Y axis wires from the Y axis wire to which they are attached at said other side of said magnetic core elements, and then repeating the steps described above to string the respective Y axis wires through the corresponding core elements of any adjacent string of core elements present in the array.

5. A method of making a magnetic core memory array including orthogonal row and columns of annular magnetic core elements, each magnetic core element having X and Y axis conductors, said method comprising the steps of: stringing a plurality of annular magnetic core elements over each of a number of non-magnetic bare wires to form individual strings of core elements, the number of core elements in each string of core elements being equal to the number of columns of core elements in the array, supporting the strings of core elements in spaced relationship with the strings of core elements being parallel to one another, said non-magnetic wire of each string of core elements representing an X axis conductor, connecting a series of magnetic wires each representing the Y axis conductor to one of the aforesaid X axis wires associated with one of the outermost strings of core elements at respective points located on the same sides of the respective core elements of the string involved, pulling the non-magnetic X axis wire through the associated string of core elements to pull the magnetic Y axis wires connected thereto through the adjacent core elements, then severing each of said magnetic Y axis wires from said non-magnetic X axis wires on said other sides of the core elements by magnetically drawing the magnetic wire at so away from the attached X axis non magnetic wire and then cutting the Y axis wires drawing said severed magnetic Y axis wires into engagement with the non-magnetic X axis wire of the adjacent string of core elements at points corresponding to the points of connection thereof to said non-magnetic X axis wire of the first-mentioned string of core elements, pulling the non-magnetic X axis wire of the adjacent string of core elements in a direction to bring the magnetic Y axis wires through the adjacent core elements to the opposite side of the core elements, severing the magnetic Y axis wires from the non-magnetic Y axis wire to which they are attached at said other side of said magnetic core elements, and then repeating the steps described above to string the respective axis wires through the corresponding core elements of any adjacent string of core elements present in the array.

6. A method of making a magnetic core memory array including orthogonal row and columns of annular magnetic core elements, each magnetic core element having X and Y axis half current input conductors and an output conductor passing therethrough, said method comprising the steps of: stringing a plurality of annular magnetic core elements over each of a number of bare wires to form individual strings of core elements, the number of core elements in each string of core elements being equal to the number of columns of core elements in the array, supporting the strings of core elements in spaced parallel reltaionship, said wire of each string of core elements representing an X axis half current input conductor, connecting a series of wires representing Y half axis current input conductors to one of the aforesaid X axis wires associated with one of the outermost string of core elements at respective points located on the same sides of the respective core elements of the string involved, pulling the X axis wire through the associated string of core elements to pull the Y axis wires connected thereto through the adjacent core elements, then severing each of said Y axis wires from said Y axis wire on said other sides of the core elements, bringing said severed Y axis wires into engagement with the X axis wire of the adjacent string of core elements at points corresponding to the points of connection thereof to said X axis wire of the first-mentioned string of core elements, pulling the X axis wire of the adjacent string of core elements in a direction to bring the Y axis wires to the opposite side of the core elements, severing the Y axis wires from the X axis wire to which they are attached at said other side of said magnetic core elements, and then repeating the steps described above to string the respective Y axis wires through the corresponding core elements of any adjacent string of core elements present in the array and an output wire through each of the core elements.

7. A method of making a multi-planar magnetic core memory array including in each plane thereof orthogonal row and columns of annular magnetic core elements, each magnetic core element having X and Y axis half current input conductirs and a Z axis output conductor passing therethrough, said method comprising the steps of: stringing a plurality of annular magnetic core elements over each of a number of bare wires to form individual strings of core elements, the number of core elements in each string of core elements being equal to the number of columns of core elements in each plane of the array, supporting respective groups of strings of core elements in spaced parallel planes with the strings of core elements in each plane being parallel to one another and to the strings of core elements in the other planes of the array, said wire of each string of core elements representing an X axis half current input conductor, connecting a series of wires representing Y axis half current input conductor to one of the aforesaid X axis wires associated with one of the outermost strings of core elements in each of the planes of the array at respective points located on the same sides of the respective core elements of the string involved, pulling the X axis wire through the associated string of core elements to pull the respective Y axis wires connected therethrough through the adjacent core elements, then severing each of said respective Y axis wires from said X axis wire to which they are attached on the other sides of the core elements involved, drawing each of the respective Y axis wires into engagement with the X axis wire of the adjacent string of core elements in the plane involved at points corresponding to the points of connection thereof to the X axis wire of the first-mentioned string of core elements, pulling the X axis wire of the adjacent string of core elements in a direction to draw the Y axis wires through the adjacent core elements to the opposite side of the core elements, and severing the Y axis wires from the X axis wire to which they are attached at said other side of said magnetic core elements, then repeating the steps described above to string the respective Y axis wires through the corresponding core elements of any adjacent string of core elements present in the corresponding plane of the array, and then stringing Z axis half current output conductors through the corresponding cores in each of the planes of the array by connecting additional wires to the X axis wires of the various string of core elements in one of the outer planes of the array, then pulling the latter wires to draw the Z axis of wires through the associated core elements, severing the Z axis wires from the X axis wires to which they are attached and repeating the attaching, pulling and severing operations described above to draw the Z axis magnetic wires through the corresponding cores of the array.

8. A method of making miniature magnetic core elements by forming green magnetic ferrite cores, placing the green cores onto a wire to form a string of cores, and replacing this wire during the subsequent operations by pulling in with the inserted wire other wires suitably applicable during that particular operation.

9. A method of stringing a new conductor through at least one miniature annular magnetic core having already at least one conductor going through said core, said method comprising attaching of the new conductor to a throughgoing wire on one side of the core, pulling the throughgoing wire to bring the new conductor through to the other side of the core or string of cores, and cutting the said new conductor wire at a point contiguous to the said throughgoing wire.

10. A method of making miniature magnetic core elements having at least one conductor passing therethrough, said method comprising the steps of:

building up a coating of a magnetic ferrite material on a hollow open ended rod from which the ferrite material can be later removed, severing the coating at axially spaced points without cutting through the rod to provide individual annular magnetic raw ferrite core elements, and passing a wire through the hollow rod, the wire being made of a material which can withstand firing of the ferrite without sticking or contaminating the same, slipping the core elements off the rod onto the wire to form a string of cores, firing the raw ferrite core elements while supported on said wire, and subsequently attaching a conductor to an end of said first wire and pulling the first wire through said cores to bring the conductor inside said cores.

11. A method of making miniature magnetic core memory elements having at least one conductor passing therethrough, said method comprising the steps of:

providing individual annular magnetic raw core elements on a rod;

slipping the core elements off the rod onto a first wire to form a string of cores;

firing the raw core elements wheile supported on said wire; and subsequently attaching a conductor to said first wire and pulling said first wire through said cores to bring the conductor inside said cores.

References Cited

UNITED STATES PATENTS

| | | | |
|---|---|---|---|
| 2,425,127 | 8/1947 | Schaefer. | |
| 2,876,534 | 3/1959 | Savona | 29—433 |
| 3,016,597 | 1/1962 | Denes | 29—604 X |
| 3,106,703 | 10/1963 | Katzin. | |
| 3,168,778 | 2/1965 | Shafer et al. | 29—433 X |
| 3,183,567 | 5/1965 | Riseman et al. | 29—604 |

JOHN F. CAMPBELL, *Primary Examiner.*

D. C. REILEY, *Assistant Examiner.*

U.S. Cl. X.R.

29—241, 433; 264—58, 67

UNITED STATES PATENT OFFICE
CERTIFICATE OF CORRECTION

April 1, 196

Patent No. 3,435,518

Peter A. Denes

It is certified that error appears in the above identified patent and that said Letters Patent are hereby corrected as shown below:

Column 12, line 47, "non magnetic" should read -- non-magnetic --. Column 13, line 10, "Y", second occurrence, should read -- X --; line 30, "conductirs" should read -- conductors --. Column 14, line 50, "wheile" should read -- while --.

Signed and sealed this 14th day of April 1970.

(SEAL)
Attest:

Edward M. Fletcher, Jr.
Attesting Officer

WILLIAM E. SCHUYLER,
Commissioner of Pat